(12) United States Patent
Jackson et al.

(10) Patent No.: US 10,927,533 B2
(45) Date of Patent: Feb. 23, 2021

(54) SELECTIVELY ENGAGEABLE VARIABLE FLOW RATE SINK STRAINER STOPPER AND CHEMICAL ELEMENT

(71) Applicant: Fruition Designs, LLC., Wake Forest, NC (US)

(72) Inventors: David Jackson, Wake Forest, NC (US); Thomas Worth, Zebulon, NC (US)

( * ) Notice: Subject to any disclaimer, the term of this patent is extended or adjusted under 35 U.S.C. 154(b) by 333 days.

(21) Appl. No.: 15/586,449

(22) Filed: May 4, 2017

(65) Prior Publication Data

US 2018/0320346 A1    Nov. 8, 2018

(51) Int. Cl.
| | |
|---|---|
| *E03C 1/126* | (2006.01) |
| *C02F 1/68* | (2006.01) |
| *E03C 1/262* | (2006.01) |
| *E03C 1/23* | (2006.01) |

(52) U.S. Cl.
CPC .............. *E03C 1/126* (2013.01); *C02F 1/68* (2013.01); *E03C 1/2306* (2013.01); *E03C 1/262* (2013.01)

(58) Field of Classification Search
CPC . E03C 1/26; E03C 1/262; E03C 1/264; E03C 1/2306; E03C 1/2315; E03C 1/126; C02F 1/68

See application file for complete search history.

(56) References Cited

U.S. PATENT DOCUMENTS

| 322,961 | A | * | 7/1885 | Neale | E03C 1/262 4/287 |
|---|---|---|---|---|---|
| 831,767 | A | * | 9/1906 | Boden | E03C 1/262 4/287 |
| 2,166,273 | A | * | 7/1939 | Ulmer | E03C 1/262 4/287 |
| 5,377,362 | A | * | 1/1995 | Jackson | A46B 15/00 15/160 |
| 2009/0158513 | A1 | * | 6/2009 | Robles | A47K 1/14 4/294 |
| 2018/0320346 | A1 | * | 11/2018 | Jackson | E03C 1/126 |

* cited by examiner

Primary Examiner — Lessanework Seifu
(74) Attorney, Agent, or Firm — Daniel Becker

(57) ABSTRACT

A selectively engageable variable flow rate sink strainer which is selectively engageable by several complimentary and individually engageable components, and is especially adapted to providing strainer stopper and chemical functions to kitchen sinks and typical kitchen sink drains. Embodiments include ones which are variable between a maximum and minimum flow rate, the minimum rate being selectively adjustable to approximately zero, comprising a relatively alignable strainer and drain body and droppably removable and sealable strainer and an independently straining drain body and providing for chemical elements outside of a liquid soak volume and at the site of engagement of strainer and drain body.

17 Claims, 4 Drawing Sheets

SELECTIVELY ENGAGEABLE VARIABLE FLOW RATE SINK STRAINER STOPPER AND CHEMICAL ELEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

FIELD

At least some embodiments disclosed herein relate, in general, to sink strainers and stoppers, and kitchen sink drains, and liquid-activated or other chemical treatments for plumbing and deodorizing devices.

BACKGROUND

Combination sink-strainer and stopper inventions allow a sink user to select between stopping or straining liquid from flowing down a sink drain, to downstream plumbing. Stopping and straining are alternate purposes. Stopping a drain is done for the purpose of turning a sink into a fixed-volume basin, while straining a sink is for the purpose of allowing flow to exit the sink into downstream plumbing, but while guarding the downstream plumbing against becoming clogged by large or long objects.

When downstream plumbing becomes clogged, it can prevent outflow altogether, and stagnation of water leading up to and at the time of a complete clog creates an environment that is friendly to bacteria and other effects which produce an undesirable smell. Therefore, straining has often been seen as a half-step to healthy plumbing. The field of art also teaches strainers and stoppers on the basis of stopping being the correct way to prevent the undesirable condition of bad smells from emanating back upward from the drain. These alternative preferences have largely discouraged the development of a solution which affords both treatment and fragrance, as well as selecting between a stopper and a strainer, particularly in the context of a kitchen drain.

Several kitchen drain stoppers, such as a Peerless PRL043, afford stopping and straining in a single device by having a drop-in strainer which serves as a mount for a centrally-aligned depending stopper to be vertically slid into place. Because the stopper depends from the strainer, and has a significant width, it creates an obstruction below the strainer which slows the outflow from the sink. Having the strainer alone would allow a sink to drain more quickly, but would sacrifice its ability to seal off the sink without removal of the strainer and replacing it with a separate stopper.

Other kitchen drain devices comprise a chemical element for treating downstream plumbing chemically. Some devices have attempted to apply a chemical element by locating it above the strainer. However, this is undesirable, because it means that the chemical element would necessarily be above the stopper when the stopper has sealed the drain, locating the chemical element in liquid contact with the liquid soak volume of the sink. When a chemical element is located in that position, it means that anything within the sink would be subject to the effects of contact with that chemical element, namely dishes, clothing, or hands, for example. Chemicals potent enough to treat downstream plumbing against clogging or to chemically erode buildup, are likely to be undesirable to have in contact with such objects. Also, frequent soaking of the chemical with a standing volume of liquid erodes and consumes such a chemical element undesirably quickly.

Chemical elements generally are incompatible with being combined with the stopper because they create further obstruction to flow in the drain, as fully retaining the depending stopper as high as possible is desirable for maximum outflow speed, but locating a chemical element at the site of the stopper prevents it from being able to be retained as high as possible.

Therefore, it remains a persistent problem in the art that there is a conflict between selecting between a stopper and a strainer with such a device being capable of augmentation with a chemical element.

SUMMARY

The present invention, in several subsequently described exemplary embodiments, is a combination stopper and strainer which is adapted to fit into a typical sink drain, and allow a user to vary the rate of flow through the drain between the sink and the downstream plumbing, and which is also adapted to augmentation with a chemical element for at least one of chemical treatment of downstream plumbing and fragrance. It does this by being a "selectively engageable" stopper and strainer device. The device is "selectively engageable" by allowing for particularized engagement of several pieces with respect to one another in complimentary and optional ways, and also by providing engagements between some components which are selectively engaged to provide varying degrees of engagement qualities.

One preferred mode comprises three main components, a strainer, a drain body, and a chemical element. The drain body is central to such embodiments, being designed to engage the bore of a drain, and provide an otherwise open drain with a boundary which allows for an airspace above the downstream plumbing, as well as one which serves as the lower bound for arresting the flow of liquid out of the sink, in order to create a "liquid soak volume" within the sink.

The strainer is a component which functions similarly to several strainers otherwise taught in the art, insofar as they provide a porous object which allows liquid flow but which catches large objects from passing into the drain. Unlike other strainers in the art, however, the strainer is adapted to be fit relative to the drain body, rather than merely the drain itself, and the strainer and drain body are adapted to be selectively engaged to one another by relative angular alignment.

This relative angular realignment allows the device to vary between a maximum and minimum flow rate, rather than the stopper-strainers of the prior art, which are limited to bimodally operate as either a strainer or a stopper, and which typically also create a flow restriction downstream of the strainer. By alignment, rather than separation being the mode of articulation, the drain body and stopper can cooperatively function with the openness of a strainer with does not carry a distinct or otherwise depending stopper.

Providing straining and stopping by the relative selective engagement of two elements in close proximity provides significantly open air volume in the lower part of the drain of a typical kitchen sink drain. This air volume provides room for a chemical element. Because engaging the strainer and drain body to function as a stopper seals this air volume out of the contiguous "liquid soak volume," a chemical element can be housed in that space without risking its premature degradation, and without risking its chemistry coming into contact with the contents of the sink.

Beyond the drain body being selectively engageable to the drain, and the strainer being relatively selectively engageable to the drain body, and the strainer body combination being selectively engageable with a chemical element, the device is selectively engageable in at least two other ways.

In the first way, the drain body, with its body flow paths can function as a standalone in-drain sink-strainer, independent of the drop-in strainer. Therefore, articulating between stopping in straining is available by either rotating the strainer in situ (in several embodiments, at a constant height, rather than lifting as it rotates), as well as by simply lifting the strainer out. Among several contemplated embodiments, the strainer and body engagement is assisted by a friction-reducing, seal-improving engagement layer, between the strainer and drain body.

The selective engagement of the strainer with respect to the drain body may be enhanced where the drain body is configured and assembled such that it fits tightly enough to the drain that it becomes semi-permanently installed. With such a tight fit, applying force to rotate the strainer relative to the drain body is more easily able to realign the strainer, because the fit with respect to the drain and body is so much stronger than the fit between the strainer and body.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

FIGS. 1-4 provide views of exemplary embodiments of the present invention, but are not intended to limit the scope of the invention against any presently contemplated embodiments supported by the overall disclosures made within this application, nor as a limit against future-contemplated embodiments by the inventor or other entities which would otherwise be anticipated by the claims of this application.

Figure 1:
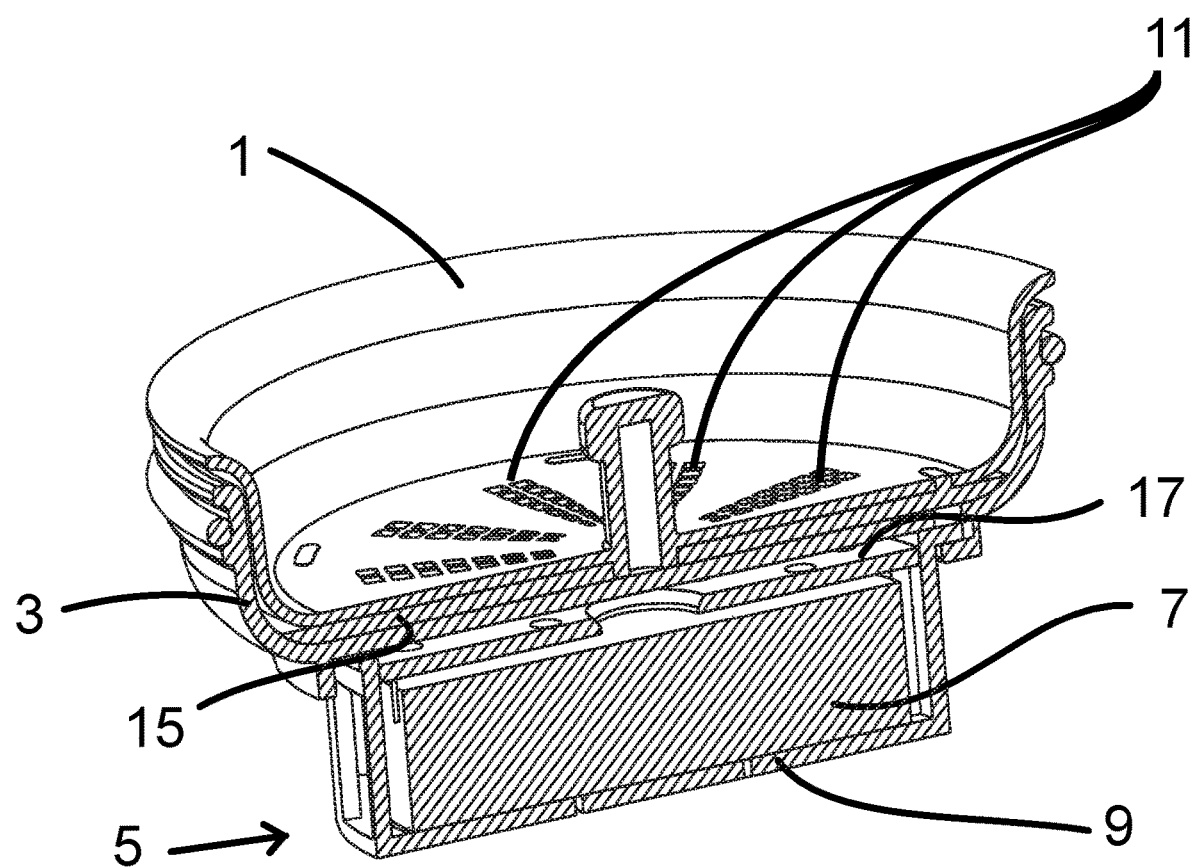
FIG. 1 is an assembled section view of a sink drain strainer embodiment in accordance with the present disclosure.
Figure 2:
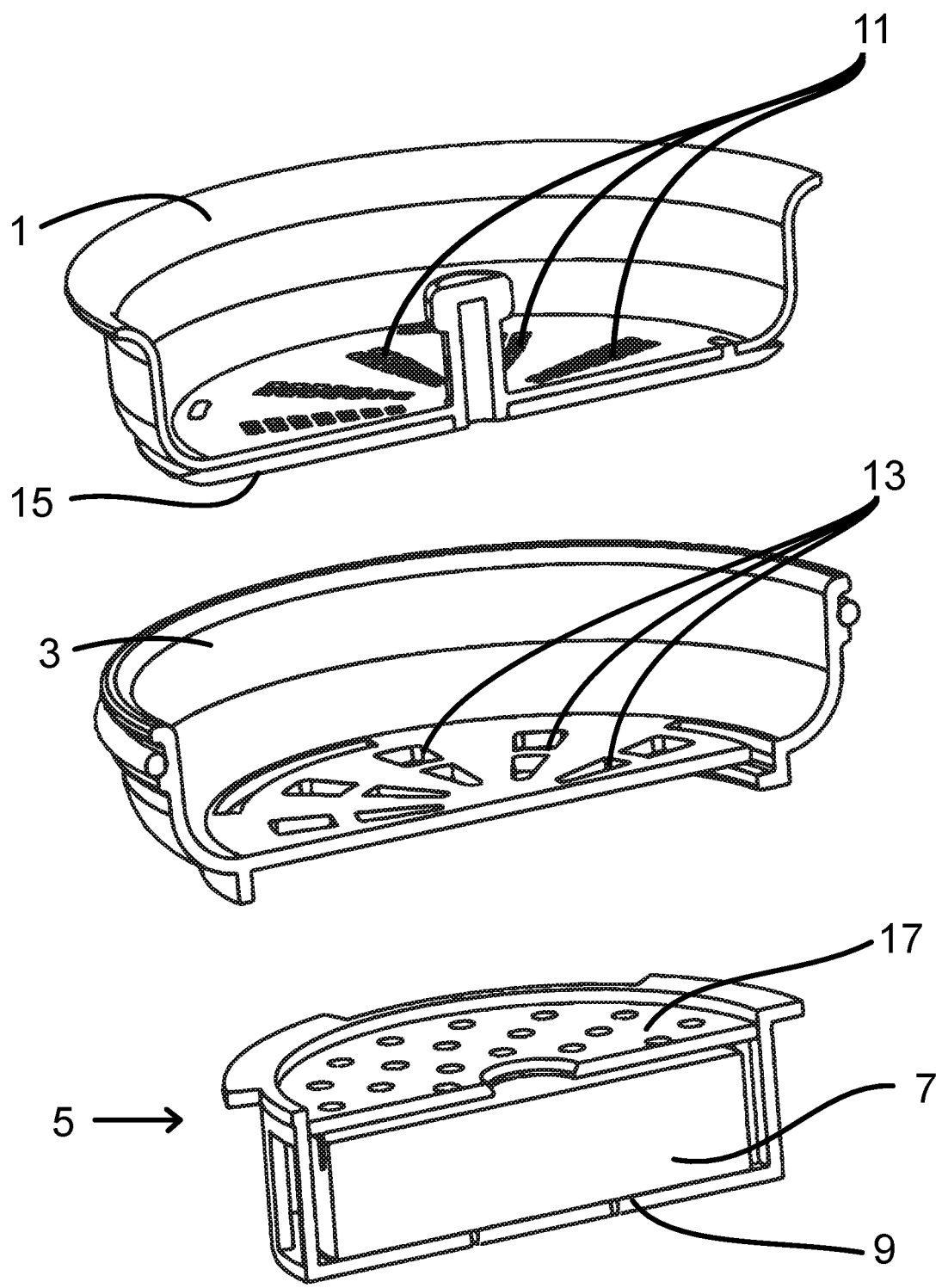
FIG. 2 is an exploded section view of a sink drain strainer embodiment in accordance with the present disclosure.
Figure 3:
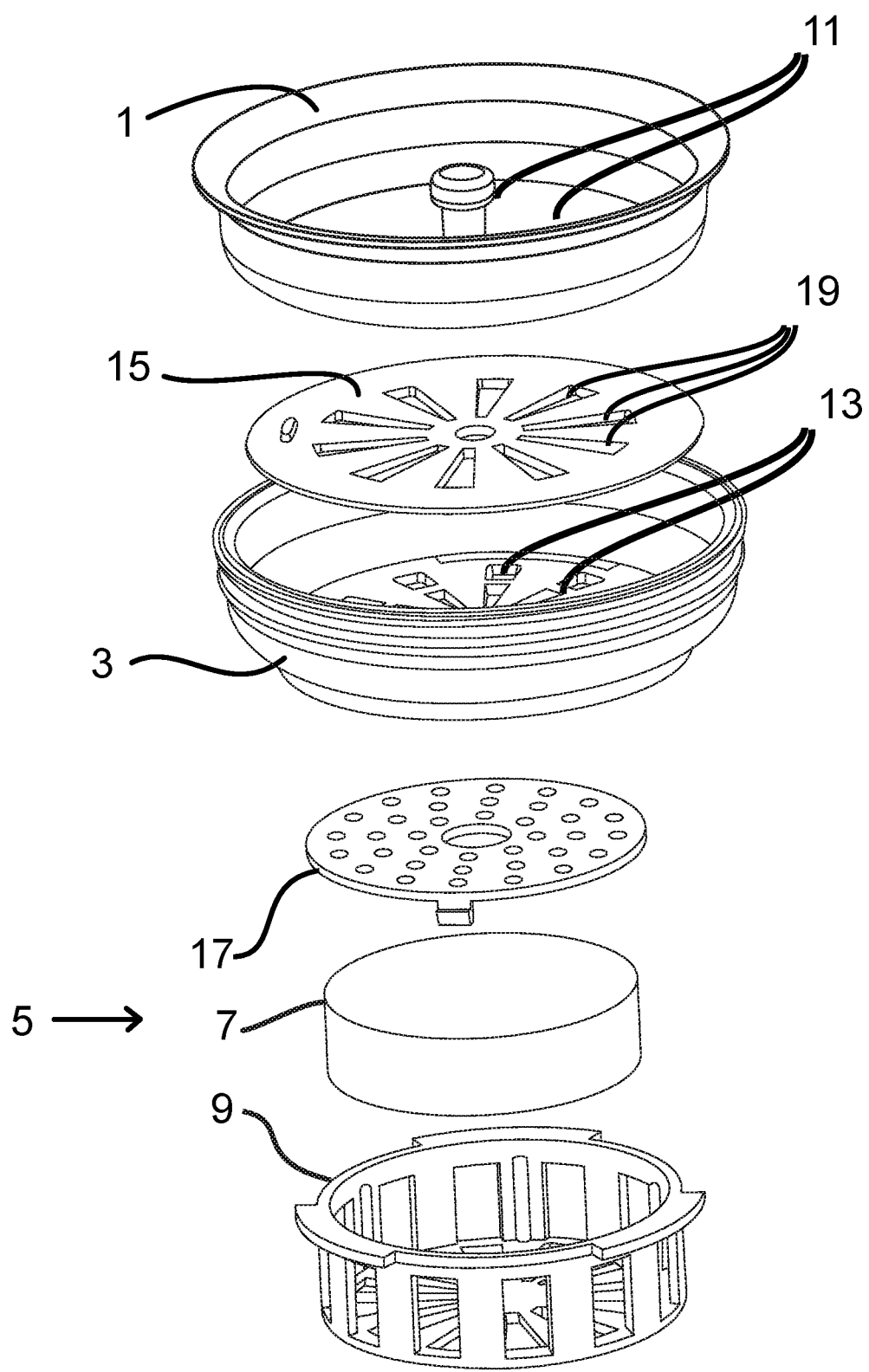
FIG. 3 is an exploded view of a sink drain strainer embodiment in accordance with the present disclosure.

Referring now to FIGS. 1-3, there are several alternative views of an exemplary embodiment contemplated as demonstrative of the broader notion of the present invention. There is a strainer 1, a drain body 3, and a chemical element 5. The strainer 1, drain body 3, and chemical element 5 are selectively engageable in vertical sequential order.

The strainer 1 is able to be dropped vertically into the drain body 3, but fits in a manner that allows the strainer 1 to be cleanly lifted away from the drain body 3 with little resistance. Chemical element 5 contains a chemical 7, which is contained within a cartridge 9. This type of chemical element 5 is engageable with the drain body 3 from the underside, and the shape and size and torsional strength of the cartridge 9 makes it easy for a user to selectively engage or remove the chemical element 5 from the drain body 3, and without requiring the user to handle the chemical 7 directly.

The strainer 1 and drain body 3 are both objects that are each of generally contiguous material, but each are provided with some porous features. The porous features of the strainer are strainer flow paths 11, and the porous features of the drain body are body flow paths 13.

In FIG. 1, the exemplary strainer is shown assembled, and the strainer 1 and drain body 3 are engaged with one another. In this position, the strainer 1 is rotatable with respect to the drain body 3, in situ. Here, in situ is meant to convey that the strainer 1 is able to be rotated without lifting it away from the drain body 3, meaning that it is rotatable while engaged with the drain body.

In this specific embodiment, the strainer 1 also is continuously rotatable, meaning that it can rotate freely, with no positioning limit. It also is meant to convey that this embodiment is able to be positioned to any angular position with respect to the drain body, without detents or stops, and is not in any other way necessarily delimited in angular position to a pre-selected alternative position. Also, the strainer 1 is rotatable in situ insofar as it is engaged with the drain body 3 at a particular height, and that is rotatable at that height, without being altered or varied from that height, nor needing to be vertically offset to a different distance from the drain body 3 as it rotates.

Continuing with respect to FIG. 1, a layer ply 15 is located between the strainer 1 and the drain body 3. The layer ply 15 reduces the friction between the strainer 1 and the drain body 3 to enhance the rotatability of the strainer 1 to rotate without requiring it to be lifted or varied in its relative distance from the drain body 3. The layer ply 15 also improves consistency of fit with respect to the strainer 1 and drain body 3, enhancing the ability of the strainer 1 to sealably engage with the drain body 3. In this sense, the layer ply 15 is also a seal layer ply.

In FIG. 3, the exploded view of the device shows that layer ply 15, like the strainer 1 and drain body 3, is of a generally contiguous material, but is porous insofar as it comprises layer ply flow paths 19. Like the strainer 1, the layer ply 15 is selectively alignable with respect to the drain body 3. Alignment of the layer ply flow paths 19, with respect to the strainer flow paths 11, or the body flow paths 13, renders the layer ply 15 into a co-porous engagement layer ply.

In FIG. 2, the layer ply 15 is fixed to the strainer 1, showing an exemplary embodiment of the layer ply being a co-porous layer ply. As the strainer 1 is selectively engageable with respect to the drain body 3, the layer ply 15 is also selectively engageable with respect to the drain body 3, since rotating the strainer 1 also rotates the layer ply 15. Thereby, the selective engagement of the strainer 1 (by rotation) effects the selective engagement of the layer ply 15 with respect to the drain body 3.

Referring now to FIGS. 1-3, the cartridge 9 comprises flow tailoring geometry, to tailor flow as it passes through the chemical element 5, to optimize the flow-activated functions of the chemical 7. The exemplary flow tailoring geometry depicted is a saturation limiting cap 17. The cap 17 allows flow through the strainer 1 and drain body 3 to pass through the device at a certain optimal flow rate for the chemical 7. As the rate of flow through the device exceeds the optimal flow rate for the chemical 7, some of the liquid will pool atop the cap 17, and the excess flow simply runs off the edge of the cap, around the chemical 7, without detriment to overall flow rate through the device.

An exemplary benefit of flow-tailoring with a saturation limiting cap 17 is that a relatively high flow rate will be prevented from accelerating the degradation of the chemical by erosion, nor will it saturate the chemical 7 in excess of an ideal amount to activate the chemical 7 (such as in the case of where the chemistry of the chemical 7 is one relating to an anti-microbial reaction), maximizing the functional lifespan of the chemical element 5.

Figure 4:
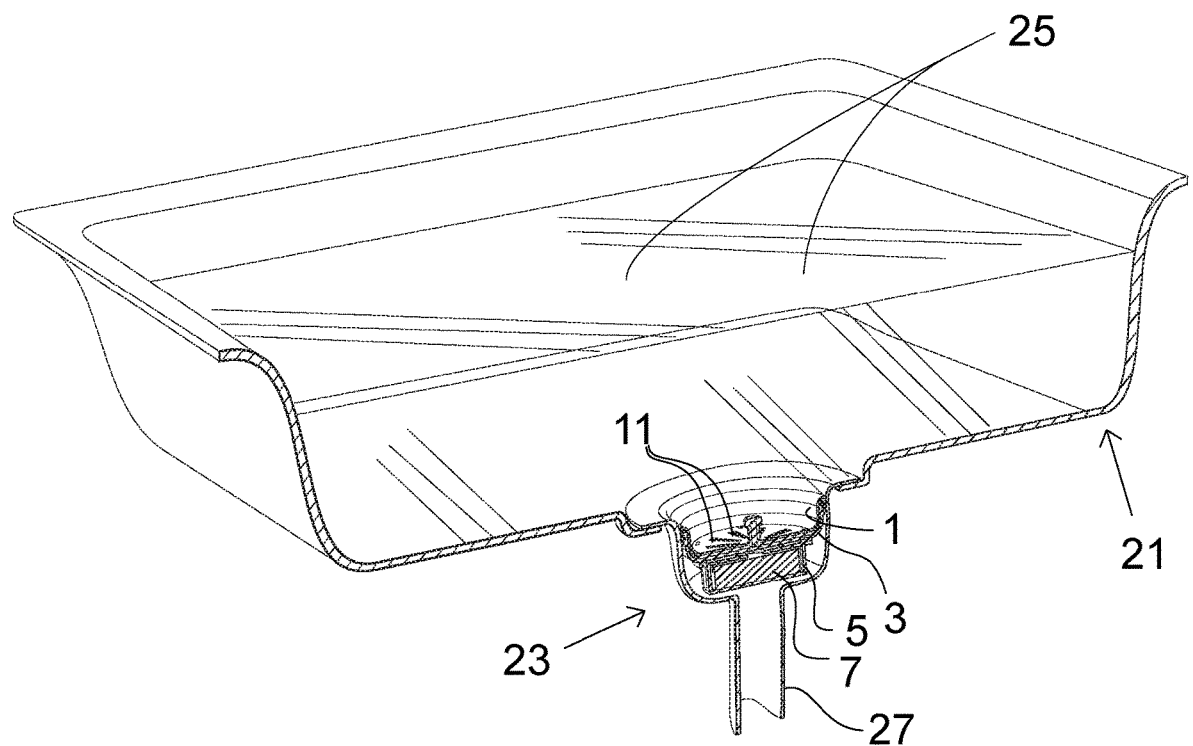
FIG. 4 is a perspective section view of a sink drain strainer embodiment in accordance with the present disclosure, as fit into a sink drain of a sink containing a liquid soak volume.

Referring now to FIG. 4, an exemplary embodiment of the strainer 1, drain body 3, and chemical element 5, are shown assembled and inserted into a drain 23 at bottom of a sink 21. Here, the strainer 1 has been rotated to an angular position, relative to the drain body 3, such that the strainer flow paths 11 and body flow paths 13 are in complete misalignment. In this position, the liquid flow rate through the device has been varied down to its minimum flow rate. This embodiment is one in which the minimum flow rate of the device is equal to zero, and the device has effectively become a stopper. At such a low flow rate, liquid has now accumulated into a standing liquid soak volume 25. In this position, the device provides a lowermost boundary of the sink 21, and seals off from downstream plumbing 27 the liquid soak volume 25. Situated in an air volume beneath the drain body 3, the chemical element 5 is completely excluded from the liquid soak volume 25. Because it is not in contact with the liquid soak volume, the chemical 7 does not come into contact with any liquid, preserving its functional lifespan.

By excluding the chemical 7 from the liquid soak volume 25, the chemical 7 is also excluded from being in liquid contact with any other objects which might be within the sink at that time, such as dishes or clothing, or even an infant having a bath. All of those objects are ones which might be adversely affected by contact with a chemical 7 having chemistry that might be useful to treat the downstream plumbing 27.

If the strainer 1 and drain body 3 were to be rotated into at least partial alignment, liquid would then drain through the device according to the degree of selective engagement between the strainer flow paths 11 and the at least partially aligned body flow paths 13. This flow would then be tailored locally to the chemical element 5, and could then activate the chemistry in the chemical 7 to cause the chemical 7 to treat the downstream plumbing 27. After the liquid has fully passed through the device, the chemical element 5 would then be in contiguous air-contact with the sink and the surrounding areas. In such usage, the chemical element 5 could then also function as an air-miscible fragrance dispenser or deodorizer. If it became desirable to cease excessive fragrance from emanating from the chemical element 5, the selective engageability of the device allows the user to selectively engage the strainer 1 with respect to the drain body 3, varying the relative alignment of the strainer flow paths 11 and the body flow paths 13 to limit or stop the flow rate of air (and the fragrance carried by the air) between the downstream plumbing 27 and the sink 21.

Additionally, even embodiments that do not have a distinct chemical element similar to chemical element 5 can also provide similar benefits where the layer ply 15 is infused with a chemical composition adapted to either plumbing treatment, or aromatic or fragrance properties, or both. In such an embodiment, the layer ply 15 can be considered a chemical element. In the case of an embodiment in which such a layer ply 15 and a distinct chemical element 5 are used, then the device would be an embodiment that can function as a two-chemical or two-fragrance device.

The drain body 3, even without a distinct strainer (such as strainer 1) or a distinct chemical element (such as chemical element 5), can nevertheless still function alone as a sink-strainer, as a liquid soak volume 25 draining from a sink 21 would still have to pass through the body flow paths 13 in order to flow through the drain 23, to reach the downstream plumbing 27.

The above-disclosed details and the figures which they describe are merely exemplary and should not be understood as limitations beyond the broadest reasonable interpretation of the claims.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

We claim:

1. A device for removable insertion into a sink bottom, the device comprising a strainer and a drain body that comprise strainer flow paths and drain body flow paths, respectively, the drain body being semi-permanently insertable into the drain of a sink, at a height which is below the top of the drain of the sink, defining the volume of the sink and drain that is above the drain body as a liquid soak volume, and wherein the strainer is selectively engageable with the drain body to control a flow rate out of the sink by the strainer being freely liftable and droppable into the drain body, and continuously rotatable with respect to the drain body to variably align the flow paths of the strainer and the flow paths of the drain body through a range of positions between a minimum flow rate position and a maximum flow rate position, corresponding to complete misalignment and complete alignment, respectively.

2. The device of claim 1, wherein the strainer is alternately removable and continuously rotatable while it is inserted into the drain body to be engaged in direct contact with the drain body, without lifting the strainer out of the drain body.

3. The device of claim 1, wherein the strainer is at a continuous height while it is engaged with the drain body.

4. The device of claim 1, wherein the strainer is freely liftable and droppable into the drain body without removing the drain body from the drain.

5. The device of claim 1, wherein the device is selectively engageable by the strainer comprising an integral twisting handle thereon that does not contact or affect the drain body, such that it is rotatably positionable through continuous alternative angular positions with respect to the drain body by twisting the handle.

6. The device of claim 5, wherein the device is engageable by comprising a chemically infused engagement ply proximate the underside of the strainer and configured to offset the strainer above the drain body that is selectively alignable with respect to the drain body by rotation of the strainer with respect to the drain boy.

7. The device of claim 1, further comprising a chemical element that is affixable to the underside of the drain body when the drain body is removed from the drain, such that the chemical element is outside of the liquid soak volume when the drain body is semi-permanently installed to the drain.

8. The device of claim 7, wherein the device is selectively engageable by the chemical element being one which is selectively engageable to be alternately rotated with respect to the drain body such that it is alternately engaged and disengaged, respectively, with respect to the drain body while the drain body is removed from the drain.

9. The device of claim 7, wherein the chemical element comprises flow tailoring geometry, wherein the flow tailoring geometry tailors rate of flow to an optimal flow rate for the chemical element.

10. The device of claim 9, wherein the flow tailoring geometry comprises a flow limiting cap.

11. The device of claim 1, further comprising a chemical element, wherein the flow rate out of the sink passes through a kitchen sink drain, and wherein the device is selectively engageable by the drain body being engageable to the kitchen sink drain, and wherein the chemical element is selectively engageable to the drain body downstream of the drain body.

12. The device of claim 1, wherein the device is configured to semi-permanently fit with respect to an interior bore of a sink drain, such that the device is inserted by pressing the drain body into the drain and dropping the strainer into the drain and removable by lifting the strainer out of the drain without effecting force to the drain body, and removing the drain body by particularized lifting force, independent of the strainer, to overcome the semi-permanent press fit.

13. A device for removable insertion into a sink bottom, the device comprising a strainer and a drain body, wherein the strainer is selectively engageable with the drain body to control a flow rate out of the sink; and
further comprising a friction-reducing engagement ply between the strainer and the drain body.

14. A device for removable insertion into a sink bottom, the device comprising a strainer and a drain body, wherein the strainer is selectively engageable with the drain body to control a flow rate out of the sink, wherein the device is engageable by the strainer comprising an engagement seal ply configured to engage between the strainer and the drain body.

15. A device for removable insertion into a sink bottom, the device comprising a strainer, a drain body, and a chemical element, wherein the strainer and drain body comprise strainer flow paths and drain body flow paths, respectively, the drain body being insertable into the drain of a sink, at a height which is below the top of the drain of the sink, defining the volume of the sink and drain that is above the drain body as a liquid soak volume, and wherein the strainer is selectively engageable with the drain body to control a flow rate out of the sink by the strainer being freely liftable and droppable into the drain body, and wherein the chemical element is affixable to the underside of the drain body when the drain body is removed from the drain, such that the chemical element is outside of the liquid soak volume when the drain body is installed to the drain.

16. The device of claim 15, wherein the strainer is continuously rotatable with respect to the drain body when the drain body is semi-permanently fit to the drain, to variably align the flow paths of the strainer and the flow paths of the drain body through a range of positions between a minimum flow rate position and a maximum flow rate position, corresponding to complete misalignment and complete alignment, respectively, by the strainer comprising an integral twisting handle that does not contact or affect the drain body.

17. The device of claim 15, wherein the drain body is configured to semi-permanently fit with respect to an interior bore of a sink drain, such that the device is inserted by pressing the drain body into the drain and dropping the strainer into the drain and removable by lifting the strainer out of the drain without effecting force to the drain body, and removing the drain body by particularized lifting force, independent of the strainer, to overcome the semi-permanent press fit.

\* \* \* \* \*